United States Patent
Tobias et al.

(10) Patent No.: US 6,612,451 B2
(45) Date of Patent: Sep. 2, 2003

(54) MULTI-FUNCTIONAL BASE FOR A PLASTIC, WIDE-MOUTH, BLOW-MOLDED CONTAINER

(75) Inventors: John W. Tobias, Spartanburg, SC (US); Richard K. Ogg, Littlestown, PA (US)

(73) Assignee: Graham Packaging Company, L.P., York, PA (US)

(*) Notice: Subject to any disclaimer, the term of this patent is extended or adjusted under 35 U.S.C. 154(b) by 0 days.

(21) Appl. No.: 10/124,734

(22) Filed: Apr. 17, 2002

(65) Prior Publication Data

US 2002/0153343 A1 Oct. 24, 2002

Related U.S. Application Data

(60) Provisional application No. 60/284,795, filed on Apr. 19, 2001.

(51) Int. Cl.⁷ ............................................. B65D 90/12
(52) U.S. Cl. .................. 215/375; 215/382; 206/501; 220/609
(58) Field of Search ................ 215/373, 12.2, 215/370, 382, 371, 372, 374, 375, 376; 220/609; 206/501

(56) References Cited

U.S. PATENT DOCUMENTS

| | | |
|---|---|---|
| 3,043,461 A | 7/1962 | Glassco |
| 3,409,167 A | 11/1968 | Blanchard |
| 3,468,443 A | 9/1969 | Marcus |
| 3,727,783 A | 4/1973 | Carmichael |
| 3,935,955 A | 2/1976 | Das |
| 4,125,632 A | 11/1978 | Vosti et al. |
| 4,174,782 A | 11/1979 | Obsomer |
| 4,231,483 A | 11/1980 | Dechenne et al. |
| 4,318,489 A | 3/1982 | Snyder et al. |
| 4,355,728 A | 10/1982 | Yoshino et al. |
| 4,381,061 A | 4/1983 | Cerny et al. |
| 4,386,701 A | 6/1983 | Galer |
| 4,642,968 A | 2/1987 | McHenry et al. |
| 4,667,454 A | 5/1987 | McHenry et al. |
| 4,850,493 A | 7/1989 | Howard, Jr. |
| 4,850,494 A | 7/1989 | Howard, Jr. |
| 4,867,323 A | 9/1989 | Powers |
| 4,880,129 A | 11/1989 | McHenry et al. |
| 4,892,205 A | 1/1990 | Powers et al. |
| 5,024,340 A | 6/1991 | Alberghini et al. |
| 5,092,474 A | 3/1992 | Leigner |
| 5,133,468 A | 7/1992 | Brunson et al. |
| 5,217,737 A | 6/1993 | Gygax et al. |
| 5,234,126 A | 8/1993 | Jonas et al. |
| 5,244,106 A | 9/1993 | Takacs |
| 5,261,544 A | 11/1993 | Weaver, Jr. |
| RE35,140 E | 1/1996 | Powers, Jr. |
| 5,713,480 A | 2/1998 | Petre et al. |
| 5,785,197 A | 7/1998 | Slat |
| 5,887,739 A | 3/1999 | Prevot et al. |
| 5,908,128 A | 6/1999 | Krishnakumar et al. |
| RE36,639 E | 4/2000 | Okhai |
| 6,065,624 A | 5/2000 | Steinke |

FOREIGN PATENT DOCUMENTS

| | | |
|---|---|---|
| WO | WO 00/51895 | 9/2000 |
| WO | WO 01/40081 | 6/2001 |

*Primary Examiner*—Tri M. Mai
(74) *Attorney, Agent, or Firm*—Howson and Howson

(57) ABSTRACT

A blow molded container having a multi-functional base which enables use of the container in both hot-fill operations and pasteurization/retort operations and enables efficient vertical stacking of like containers. To this end, a portion of the base is capable of flexing upwardly and/or downwardly in response to variations in pressures in a filled and sealed container. Structurally, the base has a discontinuous concave outer annular wall forming a discontinuous standing ring and an inner annular wall functioning as a flex panel. The inner annular wall connects outwardly to a plurality of radial webs extending at an elevation above the standing ring and connects inwardly to an anti-inverting, upwardly-projecting dome. Preferably, a shoulder extends radially inward on the inward facing side of the outer annular wall above a level of the standing ring to facilitate vertical stacking of containers having like bases.

18 Claims, 4 Drawing Sheets

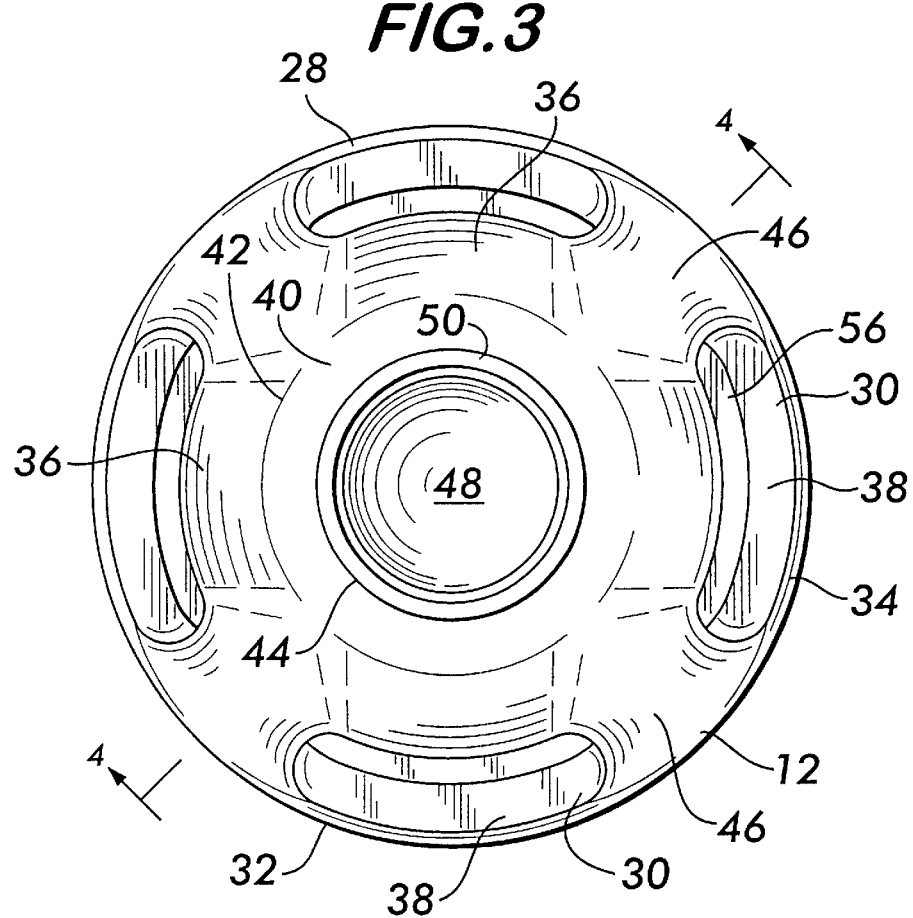
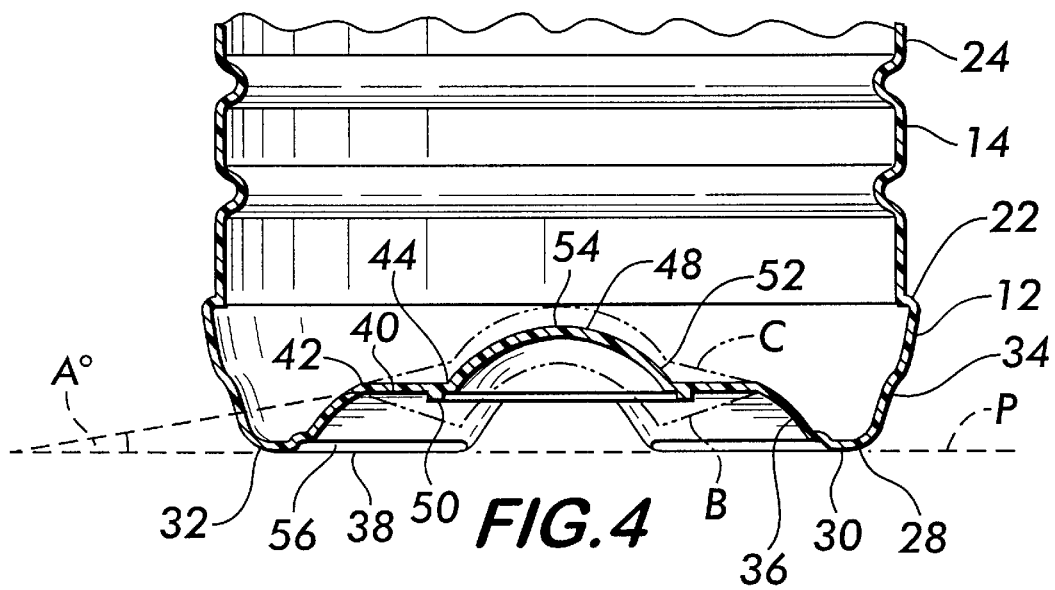

MULTI-FUNCTIONAL BASE FOR A PLASTIC, WIDE-MOUTH, BLOW-MOLDED CONTAINER

CROSS-REFERENCE TO RELATED APPLICATIONS

This application claims the benefit of U.S. Provisional Patent Application No. 60/284,795, filed Apr. 19, 2001.

FIELD OF THE INVENTION

The present invention relates to a base for a wide mouth blow-molded plastic container, and more particularly, the present invention relates to a multi-functional base structure which enables use of the container in hot-fill, as well as pasteurization/retort processing.

BACKGROUND OF THE INVENTION

Plastic blow-molded containers, particularly those molded of PET, have been utilized in hot fill applications where the container is filled with a liquid product heated to a temperature in excess of 180° F. (82° C.), capped immediately after filling, and allowed to cool to ambient temperatures. Plastic blow-molded containers have also been utilized in pasteurization/retort processes where a filled and sealed container is subjected to thermal processing and is then cooled to ambient temperatures. In both cases, the containers are typically provided with vacuum absorption panels to accommodate volumetric changes in the container as the contents of the sealed container are heated and/or as the contents cool within the sealed container.

Co-pending U.S. patent application Ser. No. 09/601,088 filed on Jul. 27, 2000 assigned to Graham Packaging Company, L.P. discloses a hot-fillable and retortable plastic wide-mouth blow-molded container having a sidewall with a pair of flex panels. The above referenced '088 application corresponds to International Application No. PCT/US00/05118 published as WO-00/51895.

Co-pending International Application No. PCT/US00/31834 also assigned to Graham Packaging Company, L.P. discloses a pasteurizable wide-mouth container having a novel base.

Other plastic wide-mouth containers having paneled sidewalls are disclosed in U.S. Pat. No. 5,887,739 issued to Prevot et al.; U.S. Pat. No. 5,261,544 issued to Weaver, Jr.; and U.S. Pat. No. 5,092,474 issued to Leigner. A pasteurizable plastic container having paneled sidewalls and a narrow neck finish is disclosed by U.S. Pat. No. 5,908,128 issued to Krishnakumar et al.

Containers having non-paneled sidewalls and yieldable endwall structures are disclosed in U.S. Pat. Nos. 4,642,968, 4,667,454 and 4,880,129 issued to McHenry et al.; U.S. Pat. No. 5,217,737 issued to Gygax et al.; U.S. Pat. No. 5,234,126 issued to Jonas et al.; U.S. Pat. No. 4,381,061 issued to Cerny et al.; U.S. Pat. No. 4,125,632 issued to Vosti et al.; and U.S. Pat No. 3,409,167 issued to Blanchard. The above cited U.S. patents disclose containers having various base structures.

The structure of a so-called footed base is disclosed, in general, in U.S. Pat. No. 4,355,728 issued to Yoshino et al.; U.S. Pat. No. 5,713,480 issued to Petre et al.; U.S. Pat. No. 3,727,783 issued to Carmichael; U.S. Pat. No. 4,318,489 issued to Snyder et al.; U.S. Pat. No. 5,133,468 issued to Brunson et al.; U.S. Pat. No. 5,024,340 issued to Alberghini et al.; U.S. Pat. No. 3,935,955 issued to Das; U.S. Pat. Nos. 4,892,205, 4,867,323 and Re. No. 35,140 issued to Powers et al.; and U.S. Pat. No. 5,785,197 issued to Slat.

U.S. Pat. No. 4,321,483 issued to Dechenne et al. discloses a base having a slightly angled annular surface and a central conical projection; and U.S. Pat. No. 4,386,701 issued to Galer discloses a blow molded plastic drum having a base which is designed to stack efficiently with the lid of a like drum.

While the above referenced containers and base structures may function satisfactorily for their intended purposes, there is a need for a plastic, wide-mouth, blow-molded container which is particularly suited for packaging a variety of viscous and other food products and which has a novel base structure that enables the container to be utilized in hot-fill and pasteurization processes. The base structure should be capable of accommodating increased internal pressure experienced during pasteurization; capable of accommodating vacuum formed in the sealed container during cool down; capable of resisting unwanted inversion or like deformation; and capable of efficient stacking with like containers.

OBJECTS OF THE INVENTION

With the foregoing in mind, a primary object of the present invention is to provide a commercially satisfactory wide-mouth blow-molded container that can be utilized in hot-fill applications as well as pasteurization, or retort, applications for packaging fluent, viscous and solid food products.

Another object of the present invention is to provide a base structure capable of accommodating an increase in internal container pressure when the sealed container is subjected to thermal treatment and capable of accommodating vacuum during cool down.

Still another object of the present invention is to provide a hot-fillable and pasteurizable container having a base which accommodates changes in internal pressure and volume and which resists unwanted inversion and other deformation.

A further object of the present invention is to provide a structure for a wide-mouth plastic container which can be efficiently stacked, one on top of the other, with like containers and which can be produced by means of high speed manufacturing equipment in an economical manner that ensures consistent quality and performance.

SUMMARY OF THE INVENTION

More specifically, the present invention provides a multi-functional base for a blow molded plastic container. The base has a discontinuous concave outer annular wall with an outer portion and an inner portion forming a standing ring therebetween. The base also includes an inner annular wall which extends inwardly and upwardly from the inner portion of the outer annular wall and which has an inner periphery and an outer periphery. The outer periphery of the inner annular wall has a plurality of radial webs extending outwardly at an elevation above the standing ring, and the inner periphery of the inner annular wall connects to an anti-inverting, upwardly-projecting dome. Functionally, the inner annular wall is capable of flexing upwardly and downwardly in response to variations in pressures in a filled and sealed container without undergoing unwanted permanent deformation. In addition, preferably a shoulder extends radially inward on the inner portion of the outer annular wall above a level of the standing ring to facilitate vertical stacking of containers having like bases.

BRIEF DESCRIPTION OF THE DRAWINGS

The foregoing and other objects, features and advantages of the present invention should become apparent from the following description when taken in conjunction with the accompanying drawings, in which:

FIG. 3 is bottom plan view of the base illustrated in FIG. 1;

FIG. 4 is a cross-sectional view of the base taken along line 4—4 of FIG. 3.

DETAILED DESCRIPTION OF THE PREFERRED EMBODIMENT

The present invention provides a container 10 which is particularly suited for use as a jar for packaging food products. For example, the container 10 can be used to package fluent or semi-fluent food products such as applesauce, spaghetti sauce, relishes, sauerkraut, baby foods, and the like. It can also be used to package a solid food product suspended in a liquid brine, such as pickles. Thus, the container 10 can be utilized for packaging various food products and can withstand various fill and treatment operations, as will be discussed.

Figure 1:
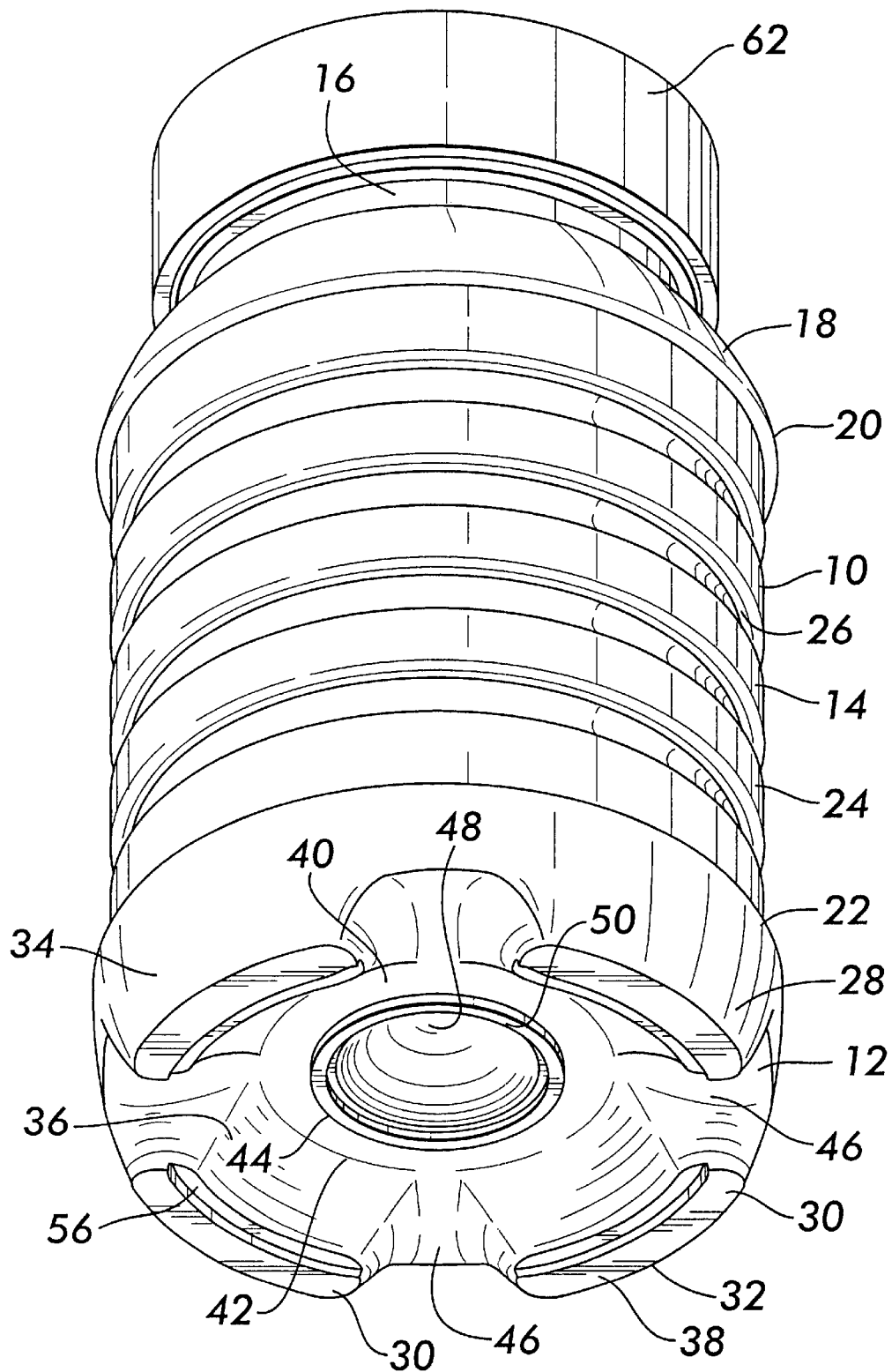
FIG. 1 is a perspective view of a container having a base embodying the present invention.
Figure 2:
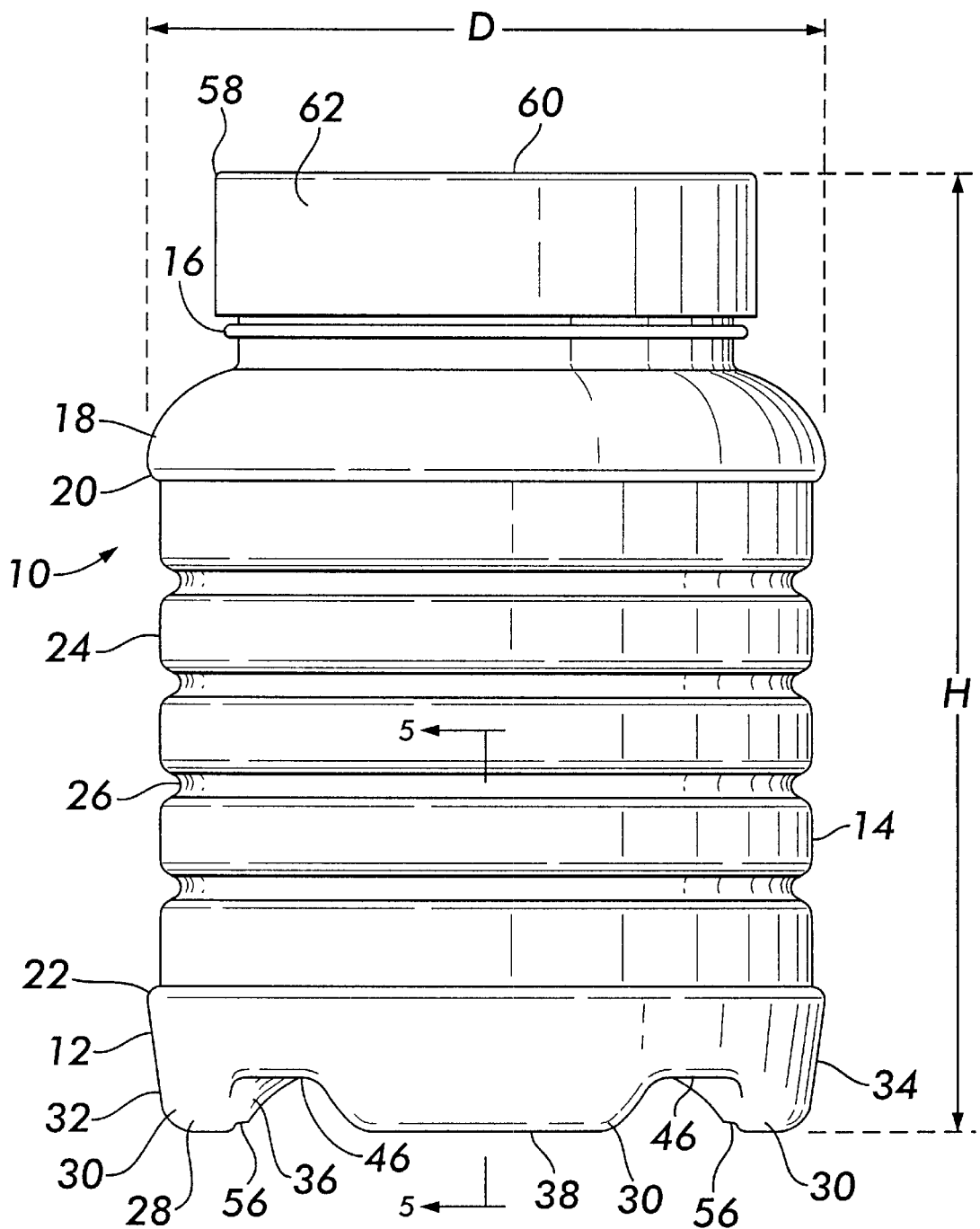
FIG. 2 is an elevational view of the container illustrated in FIG. 1.

As illustrated in FIG. 1, in one preferred embodiment of the present invention a container 10 is provided having a base 12, a substantially cylindrical sidewall 14, and a wide-mouth threaded finish 16 which projects from the upper end of the sidewall 14 via a shoulder 18. Preferably, as illustrated, upper and lower label bumpers, 20 and 22, are located adjacent the shoulder 14 and base 12, respectfully, and outline a substantially cylindrical label area 24 on the sidewall 14. Thus, a label (not shown) can be attached to, and extend completely around, the container sidewall 14. In addition, preferably the sidewall 14 has a series of circumferential grooves 26 which reinforce the cylindrical shape of the sidewall 14 and resist paneling, dents and other unwanted deformation of the sidewall 14.

The container 10 is multi-functional since it can be utilized in hot-fill as well as pasteurization/retort processing. To accomplish this objective, the base 12 has a structure which is capable of accommodating elevated internal container pressure experienced during pasteurization/retort processing and which is capable of accommodating reduced container volume experienced upon cool down of a filled and sealed container after hot-fill or pasteurization/retort processing. To this end, the base 12 flexes downwardly in a controlled manner and to a desired extent when pressure within the filled and sealed container is elevated, and the base 12 flexes upwardly in a controlled manner and to a desired extent when a vacuum develops within the filled and sealed container.

Structurally, the base 12 includes a discontinuous concave outer annular wall 28 which provides a plurality of spaced-apart, arcuate supports 30 adjacent the outer periphery 32 of the base 12. As illustrated, four supports 30 are utilized in the preferred embodiment; however, three, five or more supports 30 could also be utilized. Each support 30 has an outer wall portion 34 which extends upwardly toward the lower label bumper 22 and an inner wall portion 36 which extends upwardly and inwardly into the remaining base structure as will be discussed. A standing surface 38 is formed at the juncture of each outer and inner wall portions, 34 and 36, thereby forming a discontinuous support ring of the container 10.

An inner annular wall 40 extends within the discontinuous concave outer annular wall 28 and is preferably slightly inclined relative to the horizontal. Preferably, the inclined inner annular wall 40 extends upwardly and inwardly at an angle "A" relative to the horizontal as it extends from its outer periphery 42 to its inner periphery 44. For example, the inner annular wall 40 can incline at an angle "A" in a range of about 5° to about 6° relative to a horizontal plane "P" extending through the standing surfaces 38. Alternatively, the inner annular wall 40 can be formed substantially planar and parallel to a horizontal plane "P" extending through the standing surfaces 38.

The outer periphery 42 of the inner annular wall 40 merges with the inner wall portion 36 of each of the supports 30 and with a plurality of spaced-apart, horizontally-disposed, radial webs 46 located adjacent the outer periphery 32 of the base 12. Each of the webs 46 extends between the supports 30 and connects to the container sidewall 14 at an elevation above the horizontal plane "P" extending through the standing surfaces 38. The inner periphery 44 of the inner annular wall 40 merges into an anti-inverting dome 48 which projects upwardly into the container 10. Preferably, the inner annular wall 40 and anti-inverting dome 48 merge via an annular hinge 50. As illustrated in FIG. 4, the anti-inverting dome 48 has a conical lower portion 52 adjacent hinge 50 and a convex upper portion 54.

The inner annular wall 40 functions as a flex panel. To this end, when the internal pressure increases within a filled and sealed container, the inner annular wall 40 flexes downwardly as shown in dashed lines "B" in FIG. 4 to accommodate the increased pressure and prevent the sidewall 14 of the container 10 from undergoing unwanted permanent distortion. In addition, the inner annular wall 40 flexes upwardly to relieve vacuum when the contents of a hot filled and capped container, or a filled, capped and subsequently pasteurized container, cool to ambient. This is shown in dashed lines "C" in FIG. 4. Thus, when the sealed container and contents cool to ambient, the sidewall 14 is substantially cylindrical and unchanged from its as-formed shape and is capable of neatly supporting a wrap-around label without unwanted voids or the like beneath the label. In addition, the sidewall 14 resists ovalization and the base 12 provides a level seating surface which is not subject to rocking or the like.

The anti-inverting dome 48, the supports 30 and the radial webs 46 support the inner annular wall 40 and permit it to flex only within a desired range of movement as illustrated by dashed lines "B" and "C". For instance, the inner annular wall 40 flexes downwardly due to an increase in pressure within the container, but is prevented from complete inversion and failure by the anti-inverting dome 48 which travels with the inner annular wall 40 but substantially maintains a constant shape regardless of the internal pressure experienced within the container.

Figure 5:
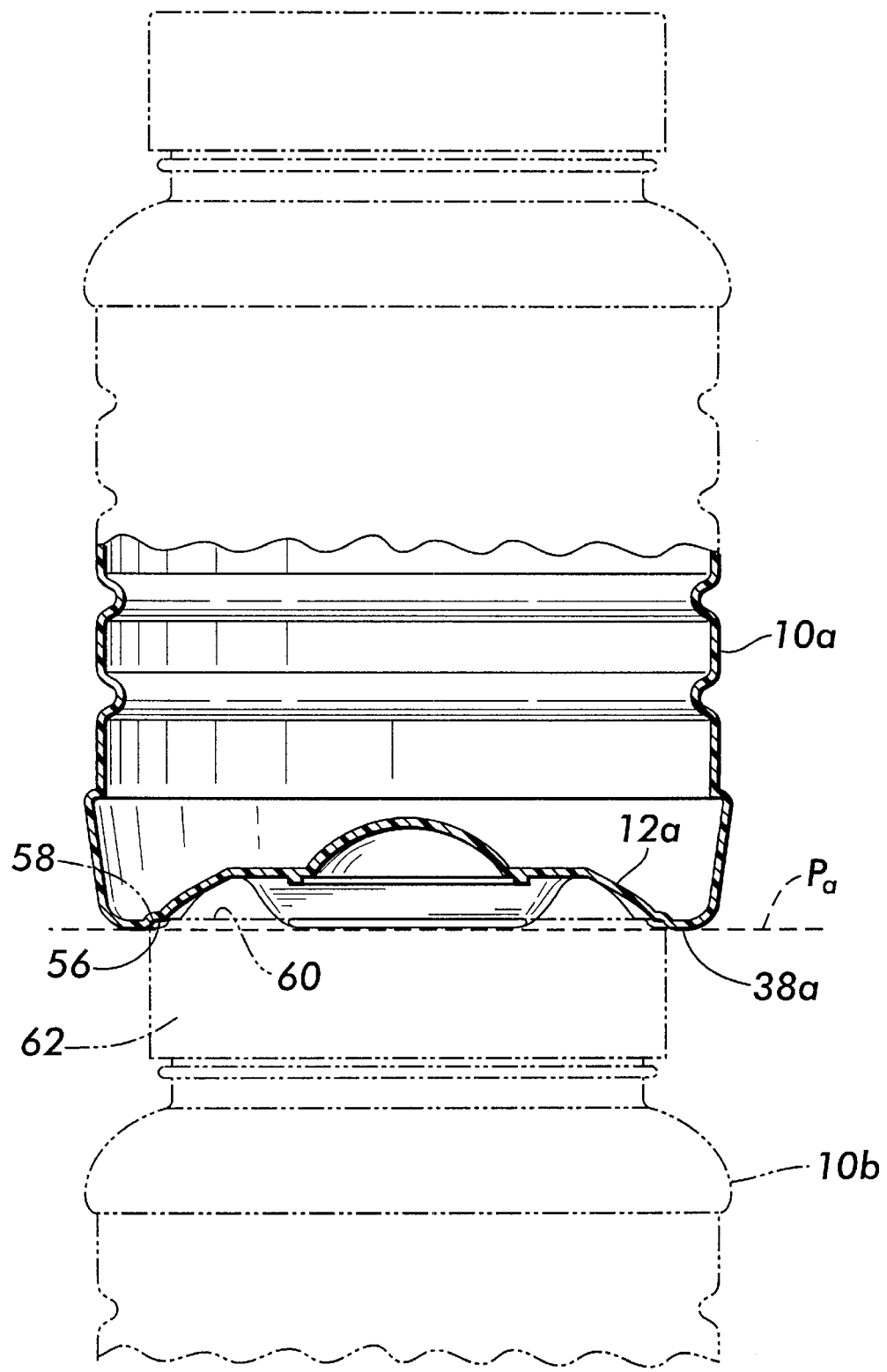
FIG. 5 is a cross-sectional view of the base taken along line 5—5 of FIG. 2 and illustrates a pair of containers in a stacked arrangement.

Another feature of the base 12 of the present invention is that each inner wall portion 36 of the arcuate supports 30 has an arcuate shoulder, or support ridge, 56 formed therein and spaced in elevation from both the support surfaces 38 and the inner annular wall 40 to facilitate vertical stacking of like containers 10. For example, as illustrated FIG. 5, an upper container 10a is stacked on a lower container 10b. The support ridge 56 in the base 12a of the upper container 10a seats on the outer edge 58 of the upper surface 60 of the lid 62 of the lower container 10b such that the horizontal plane "Pa" extending through the standing surfaces 38a of the upper container 10a extends a spaced distance beneath the top surface 60 of the lid 62 of the lower container 10b.

By way of example, and not by way of limitation, the container 10 according to the present invention preferably has a height "H" of about 5.8 inches, a container outermost diameter "D" of about 4.2 inches, and contain a capacity of about 32 fluid ounces. The discontinuous standing ring formed by the standing surfaces 38 has a diameter of about 3.6 inches, and the inner annular wall 40 of the base 12 has an inner periphery 44 with a diameter of about 1.6 inches and an outer periphery 42 with a diameter of about 2.2 inches. The radial webs 46 are uniformly spaced apart and separate each support 30 such that each support 30 is at least about 0.8 radians. In addition, each support 30 has a slightly larger arcuate extent than that of each radial web 46.

Preferably, the container 10 is blow molded from an injection molded preform made of PET, PEN or blends thereof or is extrusion blow molded of PP. In addition, the container 10 may be multilayered including a layer of gas barrier material or a layer of scrap material. Preferably, the finish 16 of the container is threaded, blow molded, and severed from an accommodation feature formed thereabove.

The above described container 10 is capable of use in hot-fill operations having fill temperatures up to 205° F. It can also be utilized in pasteurization processes wherein a cold solid product, such as pickles, is combined within the container 10 with mildly heated brine at 120 to 140° F. After the container 10 is capped, the filled container can be processed through a pasteurization tank where temperatures approach about 212° F. so that the solid products in the sealed container are heated to approximately 175° F. for 15 minutes before the filled and sealed container is cooled to ambient temperature.

While a preferred container and base structure has been described in detail, various modifications, alterations and changes may be made without departing from the spirit and scope of the present invention as defined in the appended claims.

What is claimed is:

1. A multi-functional base for a blow molded plastic container, comprising:
    a discontinuous concave outer annular wall having an outer portion and an inner portion forming a standing ring therebetween;
    an inner annular wall extending inwardly from said inner portion of said outer annular wall, said inner annular wall having an inner periphery and an outer periphery, said outer periphery having a plurality of radial webs extending outwardly at an elevation above said standing ring;
    an and-inverting dome projecting upwardly from said inner periphery of said inner annular wall; and
    a shoulder extending radially inward on said inner portion of said outer annular wall above a level of said standing ring to facilitate vertical stacking of containers having like bases;
whereby said inner annular wall is capable of deflection upwardly and downwardly in response to variations in pressures in the container without undergoing unwanted permanent deformation below the level of the standing ring.

2. A multi-functional base according to claim 1, wherein said inner annular wall in an as-formed condition inclines upwardly at an angle in a range of about 5° to about 6° relative to a horizontal plane extending through said standing ring.

3. A multi-functional base according to claim 1, wherein said anti-inverting dome has a conical lower portion and a convex upper portion.

4. A multi-functional base according to claim 1, further comprising a thin-walled body extending upwardly from said outer annular wall and having a blown wide-mouth threaded finish at an upper end of said body.

5. A multi-functional base according to claim 1, further comprising an annular hinge connecting said anti-inverting dome to said inner periphery of said inner annular wall.

6. A multi-functional base according to claim 1, wherein said base is made of PET.

7. A multi-functional base according to claim 1, wherein said standing ring has a diameter of about 3.6 inches, and said inner periphery of said inner annular wall is about 1.6 inches and said outer periphery of said inner annular wall is about 2.2 inches.

8. A multi-functional base according to claim 1, wherein said radial webs are uniformly spaced apart and separate said outer annular wall into segments each of a least about 0.8 radians.

9. A container, comprising:
    a blow molded plastic body having a circular base, a cylindrical sidewall projecting from said base, and a threaded finish opposite said base;
    said base having a discontinuous concave outer annular wall with an outer portion and an inner portion forming a container standing surface therebetween, said outer portion connecting to said sidewall;
    said base having an inner annular wall extending inwardly from said inner portion of said outer annular wall, said inner annular wall having an inner periphery and an outer periphery, said outer periphery connecting to a plurality of radial webs which extend at an elevation above said container standing surface and which connect to said sidewall;
    said base having an anti-inverting dome projecting upwardly from said inner periphery of said inner annular wall;
    said inner annular wall of said base flexing upwardly and downwardly in response to variations in pressures in the container without undergoing unwanted permanent deformation; and
    said inner portion of said outer annular wall has a support ridge formed therein above a level of said container standing surface to facilitate vertical stacking of containers having like bases.

10. A container according to claim 9, further comprising a cap for sealing said finish, said cap having a top surface with an outer edge and said outer edge of said cap being engagable with said support ridge formed on a container having a like base to facilitate vertical stacking.

11. A container according to claim 10, wherein said cylindrical sidewall provides a cylindrical label panel having a plurality of longitudinally spaced circumferential reinforcement grooves and outlined by an upper and lower label bumper.

12. A container according to claim 11, wherein said upper label bumper is formed by a shoulder which connects said sidewall to said finish.

13. A container according to claim 12, wherein said inner annular wall in an as-formed condition inclines upwardly at an angle in a range of about 5° to about 6° relative to a horizontal plane extending through said container support surface.

14. A container according to claim 13, wherein said anti-inverting dome has a conical lower portion and a convex upper portion.

15. A container according to claim 14, further comprising an annular hinge connecting said anti-inverting dome to said inner periphery of said inner annular wall.

16. A container according to claim 15, wherein said body is made of PET.

17. A container according to claim 16, wherein said discontinuous outer annular wall of said base forms four identical, equally spaced apart, arcuate supports.

18. A container according to claim 17, wherein said arcuate extent of each arcuate support is greater than an arcuate extent of each radial web.

* * * * *

UNITED STATES PATENT AND TRADEMARK OFFICE
CERTIFICATE OF CORRECTION

PATENT NO. : 6,612,451 B2
DATED : September 2, 2003
INVENTOR(S) : Tobias et al.

It is certified that error appears in the above-identified patent and that said Letters Patent is hereby corrected as shown below:

Column 5,
Line 50, "and-inverting dome" should read -- an anti-inverting dome --

Signed and Sealed this

Twenty-first Day of October, 2003

JAMES E. ROGAN
*Director of the United States Patent and Trademark Office*